US012255980B2

United States Patent
Bitar et al.

(10) Patent No.: US 12,255,980 B2
(45) Date of Patent: Mar. 18, 2025

(54) HOMOMORPHIC ENCRYPTION KEY MANAGEMENT

(71) Applicant: International Business Machines Corporation, Armonk, NY (US)

(72) Inventors: Akram Bitar, Haifa (IL); Dov Murik, Haifa (IL); Ehud Aharoni, Kfar Saba (IL); Nir Drucker, Zichron Yaakov (IL); Omri Soceanu, Haifa (IL); Ronen Levy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 18/092,467

(22) Filed: Jan. 3, 2023

(65) Prior Publication Data
US 2024/0223355 A1  Jul. 4, 2024

(51) Int. Cl.
*H04L 9/08* (2006.01)
*H04L 9/00* (2022.01)
*H04L 9/14* (2006.01)

(52) U.S. Cl.
CPC ............ *H04L 9/008* (2013.01); *H04L 9/0869* (2013.01); *H04L 9/0894* (2013.01); *H04L 9/14* (2013.01)

(58) Field of Classification Search
CPC ..... H04L 9/008; H04L 9/0869; H04L 9/0894; H04L 9/14
See application file for complete search history.

(56) References Cited

U.S. PATENT DOCUMENTS

| | | | |
|---|---|---|---|
| 10,417,455 | B2 | 9/2019 | Couillard |
| 10,594,472 | B2 | 3/2020 | Ding |

(Continued)

FOREIGN PATENT DOCUMENTS

| | | |
|---|---|---|
| CN | 104486307 B | 8/2017 |
| CN | 112800439 B | 2/2022 |

OTHER PUBLICATIONS

Asma Aloufi et al, "Computing Blindfolded on Data Homomorphically Encrypted under Multiple Keys: An Extended Survey"; Online at: https://arxiv.org/abs/2007.09270. Aug. 11, 2020.

(Continued)

*Primary Examiner* — Farid Homayounmehr
*Assistant Examiner* — Mudasiru K Olaegbe
(74) *Attorney, Agent, or Firm* — Stosch Sabo

(57) ABSTRACT

A computer-implemented method comprising: generating, from a key-seed associated with a user, a set of homomorphic encryption (HE) keys associated with an HE scheme; receiving, from a key management system (KMS) associated with said HE scheme, an encrypted version of said key-seed; storing said encrypted version of said key-seed, and said set of HE keys, in an untrusted storage location; and at a decryption stage, decrypting an encrypted computation result generated using said HE scheme, by: (i) recalling, from said untrusted storage location, said encrypted version of said key-seed, (ii) providing said encrypted version of said key-seed to said KMS, to obtain a decrypted version of said key-seed s associated with said user, (iii) generating, from said received decrypted version of said key-seed, a secret HE key associated with said HE scheme, and (iv) using said secret HE key to decrypt said encrypted computation result.

20 Claims, 15 Drawing Sheets

(56) References Cited

U.S. PATENT DOCUMENTS

| | | | | |
|---|---|---|---|---|
| 2002/0062451 | A1* | 5/2002 | Scheidt | H04L 9/0825 726/7 |
| 2013/0219164 | A1 | 8/2013 | Hamid | |
| 2019/0296896 | A1 | 9/2019 | Resch | |
| 2020/0151356 | A1* | 5/2020 | Rohloff | G06F 21/6245 |
| 2020/0228308 | A1* | 7/2020 | Shainski | G06F 21/6227 |
| 2020/0374100 | A1* | 11/2020 | Georgieva | H04L 9/0869 |
| 2021/0044419 | A1* | 2/2021 | Kim | H04L 9/0838 |
| 2021/0359846 | A1* | 11/2021 | Wright | H04L 9/0825 |
| 2022/0150048 | A1 | 5/2022 | Parulan | |
| 2022/0271914 | A1* | 8/2022 | Diallo | H04L 9/0825 |
| 2024/0346156 | A1* | 10/2024 | Ahuja | G06F 21/602 |

OTHER PUBLICATIONS

Nir Drucker et al, "Combining Homomorphic Encryption with Trusted Execution Environment: A Demonstration with Paillier Encryption and SGX"; MIST '17: Proceedings of the 2017 International Workshop on Managing Insider Security Threats, pp. 85-88, Oct. 30, 2017.

Nir Drucker et al., "Achieving Trustworthy Homomorphic Encryption by Combining it with a Trusted Execution Environment," Journal of Wireless Mobile Networks, Ubiquitous Computing, and Dependable Applications (JoWUA), 9:1, pp. 86-99, Mar. 2018.

Barker, Elaine, Recommendation for Key Management: Part 1—General, NIST Special Publication 800-57 Part 1 Revision 5, May 2020, 171 pages.

Chang et al., Lightweight Cryptography, National Institute of Standards and Technology (NIST), Jan. 3, 2017, 4 pages.

Halevi, Shai, Homomorphic Encryption, Tutorials on the Foundations of Cryptography, Apr. 6, 2017 pp. 219-276.

Post-Quantum Cryptography, National Institute of Standards and Technology (NIST), Aug. 13, 2024, 5 pages.

Security Requirements for Cryptographic Modules, Federal Information Processing Standards Publication 140-2, May 25, 2001, 64 pages.

\* cited by examiner

HOMOMORPHIC ENCRYPTION KEY MANAGEMENT

BACKGROUND

The invention relates to the field of computerized cryptography, particularly homomorphic encryption.

Homomorphic encryption (HE) is a cryptographic system that allows computations to be made on encrypted data ("ciphertext"), without first decrypting the ciphertext. Under a homomorphic encryption scheme, these computations will yield the same results, when decrypted, as if they were performed on the data in its unencrypted form ("plaintext").

As with all cryptographic algorithms, cryptographic keys play an important role in HE schemes. Having unique and well-formatted keys is a prerequisite for the security guarantees provided by these cryptographic schemes. Conversely, once an adversary obtains a cryptographic key, the associated cryptographic scheme can no longer guarantee the confidentiality or the integrity of the encrypted data.

Typically, to ensure proper handling of keys throughout their life cycle, standards organizations, such as the National Institute of Standards and Technology (NIST), provide key management system (KMS) recommendations as part of their security requirements for cryptographic modules. However, NIST information processing standards do not address HE key management. Consequently, there is still a need for an HE-based KMS.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a computer-implemented method comprising: generating, from a key-seed s associated with a user, a set of homomorphic encryption (HE) keys associated with an HE scheme; receiving, from a key management system (KMS) associated with the HE scheme, an encrypted version Es of the key-seed s; storing the encrypted version Es of the key-seed s, and the set of HE keys, in an untrusted storage location; and at a decryption stage, decrypting an encrypted computation result generated using the HE scheme, by: (i) recalling, from the untrusted storage location, the encrypted version Es of the key-seed s, (ii) providing the encrypted version Es of the key-seed s to the KMS, to obtain a decrypted version of the key-seed s associated with the user, (iii) generating, from the received decrypted version of the key-seed s, a secret HE key sk associated with the HE scheme, and (iv) using the secret HE key sk to decrypt the encrypted computation result, to obtain a decrypted version of the encrypted computation result.

There is also provide, in an embodiment, a system comprising at least one hardware processor; and a non-transitory computer-readable storage medium having program code embodied therewith, the program code executable by the at least one hardware processor to: generate, from a key-seed s associated with a user, a set of homomorphic encryption (HE) keys associated with an HE scheme, receive, from a key management system (KMS) associated with the HE scheme, an encrypted version Es of the key-seed s, store the encrypted version Es of the key-seed s, and the set of HE keys, in an untrusted storage location, and at a decryption stage, decrypt an encrypted computation result generated using the HE scheme, by: (i) recalling, from the untrusted storage location, the encrypted version Es of the key-seed s, (ii) providing the encrypted version Es of the key-seed s to the KMS, to obtain a decrypted version of the key-seed s associated with the user, (iii) generating, from the received decrypted version of the key-seed s, a secret HE key sk associated with the HE scheme, and (iv) using the secret HE key sk to decrypt the encrypted computation result, to obtain a decrypted version of the encrypted computation result.

There is further provided, in an embodiment, a computer program product comprising a non-transitory computer-readable storage medium having program code embodied therewith, the program code executable by at least one hardware processor to: generate, from a key-seed s associated with a user, a set of homomorphic encryption (HE) keys associated with an HE scheme; receive, from a key management system (KMS) associated with the HE scheme, an encrypted version Es of the key-seed s; store the encrypted version Es of the key-seed s, and the set of HE keys, in an untrusted storage location; and at a decryption stage, decrypt an encrypted computation result generated using the HE scheme, by: (i) recalling, from the untrusted storage location, the encrypted version Es of the key-seed s, (ii) providing the encrypted version Es of the key-seed s to the KMS, to obtain a decrypted version of the key-seed s associated with the user, (iii) generating, from the received decrypted version of the key-seed s, a secret HE key sk associated with the HE scheme, and (iv) using the secret HE key sk to decrypt the encrypted computation result, to obtain a decrypted version of the encrypted computation result.

In some embodiments, the method further comprises storing, and the program instructions are further executable to store, at an encryption stage, in the untrusted storage location, encrypted data provided by the user, wherein the data is encrypted using a public HE key pk from the set of HE keys stored in the untrusted storage location, and wherein the encrypted computation result is generated by executing a program associated with the HE scheme over the encrypted data.

In some embodiments, the executing is performed using an evaluation HE key ek included in the set of HE keys.

In some embodiments, the method further comprises deleting, and the program instructions are further executable to delete, the encrypted version Es of the key-seed s, and the set of HE keys, upon the storing.

In some embodiments, the receiving comprises receiving, from the KMS, an encrypted version Ek of a data key dk, and using the encrypted data key Ek to encrypt the key-seed s, to obtain the encrypted version Es of the key-seed s.

In some embodiments, the storing comprises storing the encrypted data key Ek, the encrypted version Es of the key-seed s, and the set of HE keys, in an untrusted storage location.

In some embodiments, the decryption stage comprises decrypting the encrypted computation result, by: (i) recalling, from the untrusted storage location, the encrypted data key Ek and the encrypted version Es of the key-seed s; (ii) providing the encrypted data key Ek to the KMS, to obtain a decrypted version of the data key dk; (iii) using the decrypted version of the data key dk to decrypt the encrypted version Es of the key-seed s, to obtain the key-seed s; (iii) generating, from the key-seed s, a secret HE key sk associated with the HE scheme; and (iv) using the generated secret HE key sk to decrypt the encrypted computation result.

In some embodiments, the untrusted storage location is cloud storage.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
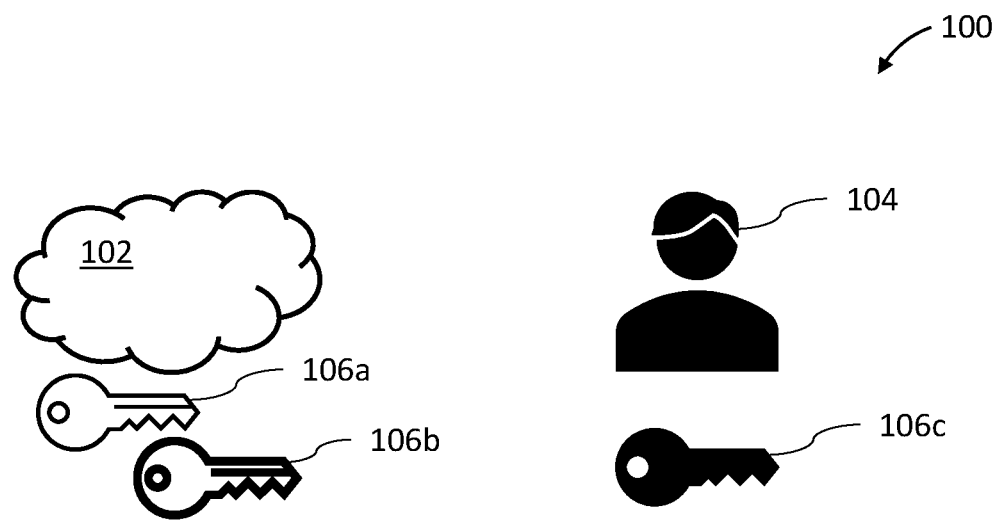
FIGS. 1A-1E illustrate various exemplary computing environments where HE schemes may be used, and which reflect various threat levels and computational overhead requirements.

Disclosed herein is a technique, embodied as a system, computer-implemented method, and computer program product, for a key management system (KMS) configured to ensure the security of encryption keys used in homomorphic encryption (HE) schemes. In some embodiments, the present technique provides for a KMS design configured to protect HE keys in an HE scheme which allows two-party or multi-party computations over encrypted data.

Present embodiments overcome a multitude of challenges; when implementing a KMS for HE schemes, at least four aspects have to be finely balanced: key size, key generation run-time, possible threat models, and ciphertext size and amount. A major issue that will affect an HE-based KMS is that HE key sizes are very large-often in the range of mega- or gigabytes, which render them much larger than the 256-bits keys of typical symmetric encryption.

In some embodiments, the present technique provides for a hierarchical key management system protocol (termed herein HE-KMS), which provides for all standard KMS capabilities, such as user logging, tracking, and key handling, within the context of HE schemes. The HE-KMS utilizes a standard KMS module (which may be implemented using a hardware secure module, HSM), to provide encryption, decryption and key management capabilities to the HE-KMS. The present disclosure will discuss the use of the present HE-KMS protocol particularly within the context of HE schemes. However, the HE-KMS protocol disclosed herein may be equally applicable within the context of other encryption schemes.

In some embodiments, the present disclosure incorporates the use of hardware secure modules (HSMs), which are tamper-resistant hardware devices that secure cryptographic processes by generating, protecting, and managing keys used for encrypting and decrypting data. HSMs can come in the form of plug-in cards or external devices that attach directly to a computer or a network server. HSMs typically have features that provide tamper evidence, tamper resistance (which makes tampering difficult without making the HSM inoperable), or tamper responsiveness (such as deleting keys upon tamper detection). HSMs may also be offered as a service, where customers can use a hardware security module in the cloud, to generate, access, and protect their cryptographic key materials.

By way of background, HE schemes permit the construction of programs for any desirable functionality, which can be run on encrypted inputs to produce an encrypted result. Since the program does not need to decrypt the input data, it can be run by an untrusted party without revealing its inputs and internal state. This capability has significant practical implications in the outsourcing of private computations, for instance, in the context of cloud computing.

For example, a data owner may wish to offer a service to third-parties in the cloud, such as a trained machine learning model which can be inferenced on private data uploaded by users. The data owner generates a set of keys comprising a secret key sk, together with an associated public key pk and an evaluation key ek. Using pk, a third-party user can upload and store sensitive data $m_i$, as encrypted by $c_i=Enc_{pk}(m_i)$. Using ek, the user can then execute a desired function (e.g., inference the trained machine learning model) over ciphertext $c_i$, to obtain an encrypted result $c_{res}$, by performing $c_{res}=Eval_{pk,ek}(f,(c_1, \ldots, c_n))$. Using sk, the user can then decrypt the encrypted result $c_{res}$, by $m_{res}=Dec_{sk}(c_{res})$, to obtain the decrypted results of the evaluation.

However, the lack of key management options for such HE schemes means that the generated private key sk must at times be directly accessed by untrusted third-party users or the cloud, and thus compromise the security of the entire encryption scheme.

FIGS. 1A-1E illustrate various exemplary computing environments where HE schemes may be used, and which reflect various threat models and computational overhead requirements.

FIG. 1A illustrates an exemplary two-party environment 100, wherein a cloud server 102 holds the public key 106a and evaluation key 106b, while a user 104 holds the secret key 106a. Cloud server 102 is any computer system available for use by multiple entities that provides on-demand availability of computer system resources and/or other computer capabilities, especially data storage (cloud storage) and computing power, without direct active management by the user.

In the scenario of exemplary environment 100, user 104 is allowed to encrypt and decrypt data, while the cloud only have access to the public keys, which means that the cloud cannot decrypt data. It is assumed that no collusion exists between the cloud server 102 and the user 104. Thus, the confidentiality of user 104 data is maintained by the underlying HE scheme. This scenario applies, for example, when user 104 wishes to upload and store private data to public cloud server 102, without compromising its security by divulging the secret key to the cloud server.

Figure 1B:
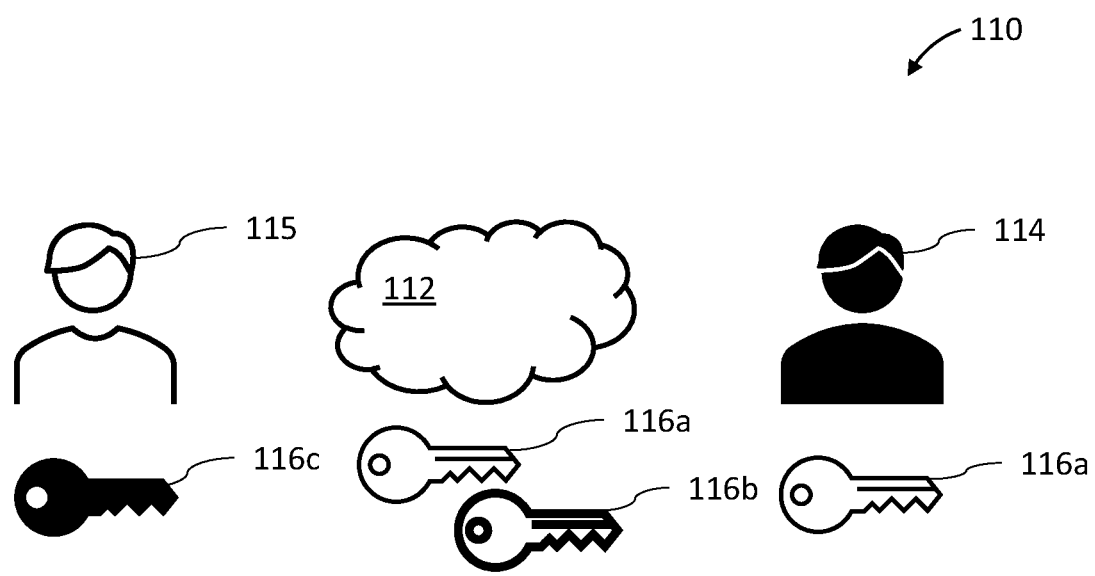

FIG. 1B illustrates an exemplary environment 110 with three or more parties. Environment 110 comprises a cloud server 112, a data owner 114, and one or more third-party users 115. In an exemplary case, data owner 114 stores an encrypted machine learning model on cloud server 112, and wishes to offer the use of the model for inferencing purposes to third parties, such as users 115, without revealing the underlying model to either of the cloud server 112 or the users 115. Subsequently, users 115 can upload private input data samples to cloud server 112, wherein the stored model is inferenced on the input data homomorphically, and outputs the encrypted results.

In the example of environment 110, users 115 own the secret key 116c, and the cloud server 112 has access to the public 116a and evaluation 116b keys needed to perform the required computations. Model owner 114 has access to public key 116a, in order to be able to encrypt its model. In order to protect the integrity of the encrypted model, it is assumed that cloud server 112 is not in collusion with any of users 115, for example, by a user 115 revealing secret key 116c to cloud server 112.

Environment 110 allows users 115 to independently upload private data for inferencing purposes, and to decrypt the encrypted results in real-time. This method also reduces the computational overhead for data owner 114, by allowing data owner 114 to rely solely on the computational resources of cloud server 112.

A potential disadvantage of environment 110, however, is that every user has access to secret key 116c. This can increase the attack surface when the secret key 116c is handled locally by the one or more users 115, wherein a single breach of secret key 116c can invalidate the security of the entire system.

Figure 1C:
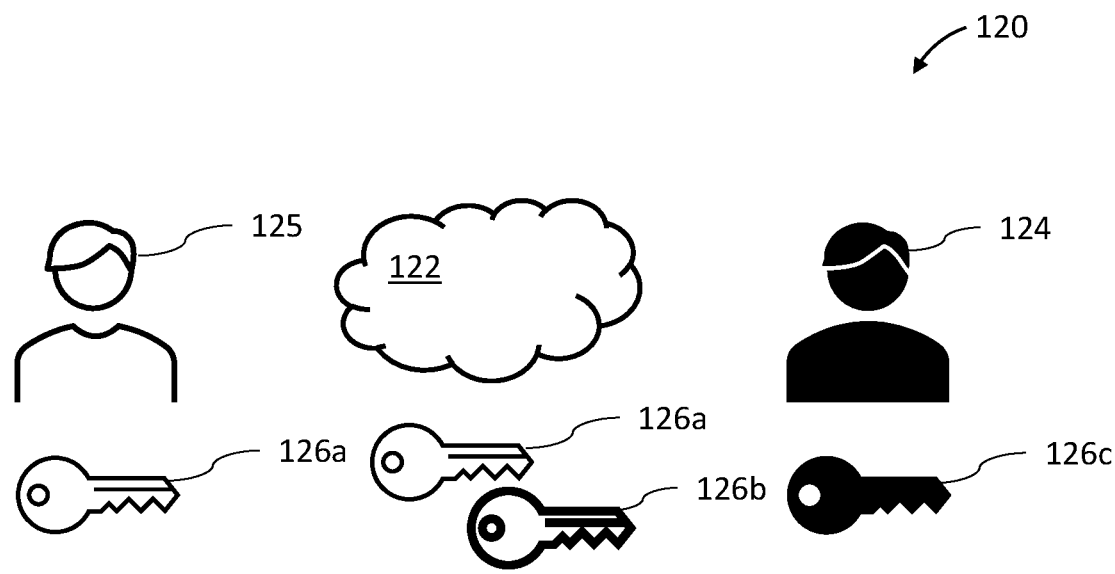

FIG. 1C illustrates another exemplary environment 120, which is a variation on environment 110 (FIG. 1B), wherein data owner 124 owns secret key 126c, while one or more users 125 only have access to public key 126a to encrypt data samples uploaded to cloud server 122 for inferencing purposes. In this case, in order to protect the data uploaded by users 125, it is assumed that cloud server 122 and data owner 124 are not colluding with one another, e.g., by data owner 124 revealing secret key 126c to cloud server 122.

A potential advantage of environment 120 is a reduction in the attack surface, because only data owner 124 has access to secret key 126c. A potential disadvantage is that users 125 must go through the data owner 124 in order to decrypt their inferencing results, resulting in increased computational overhead and bandwidth requirements for data owner 124.

Figure 1D:
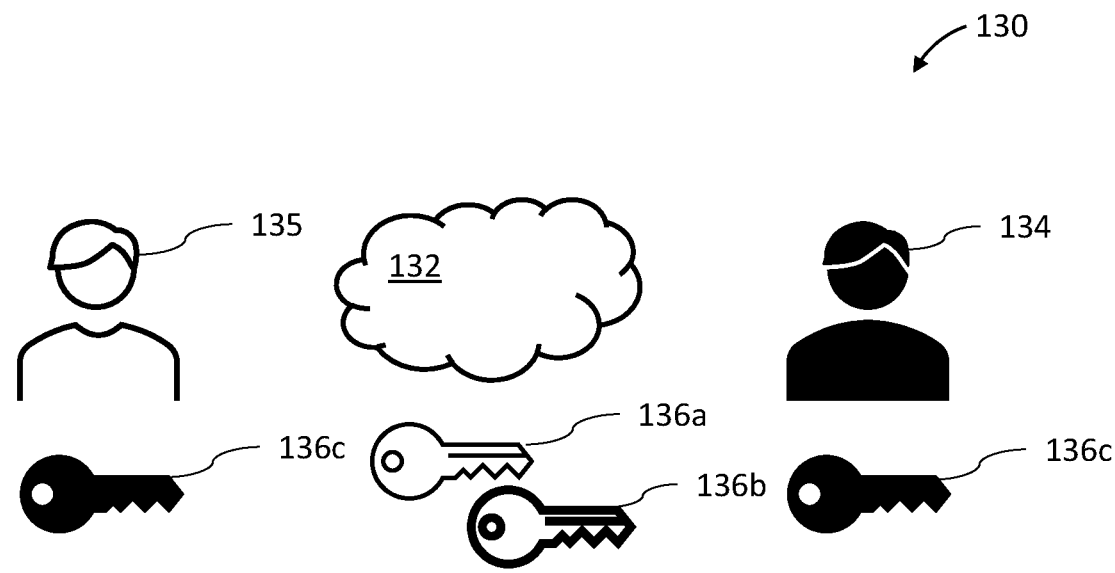

FIG. 1D illustrates yet another exemplary environment 130, wherein both data owner 134 and one or more users 135 have access to secret key 136c, while cloud server 132 has access to the public 136a and evaluation 136b keys.

A potential disadvantage of environment 130 is that every user has access to secret key 136c. This can increase the attack surface when the secret key 136c is handled locally by the one or more users 135.

Figure 1E:
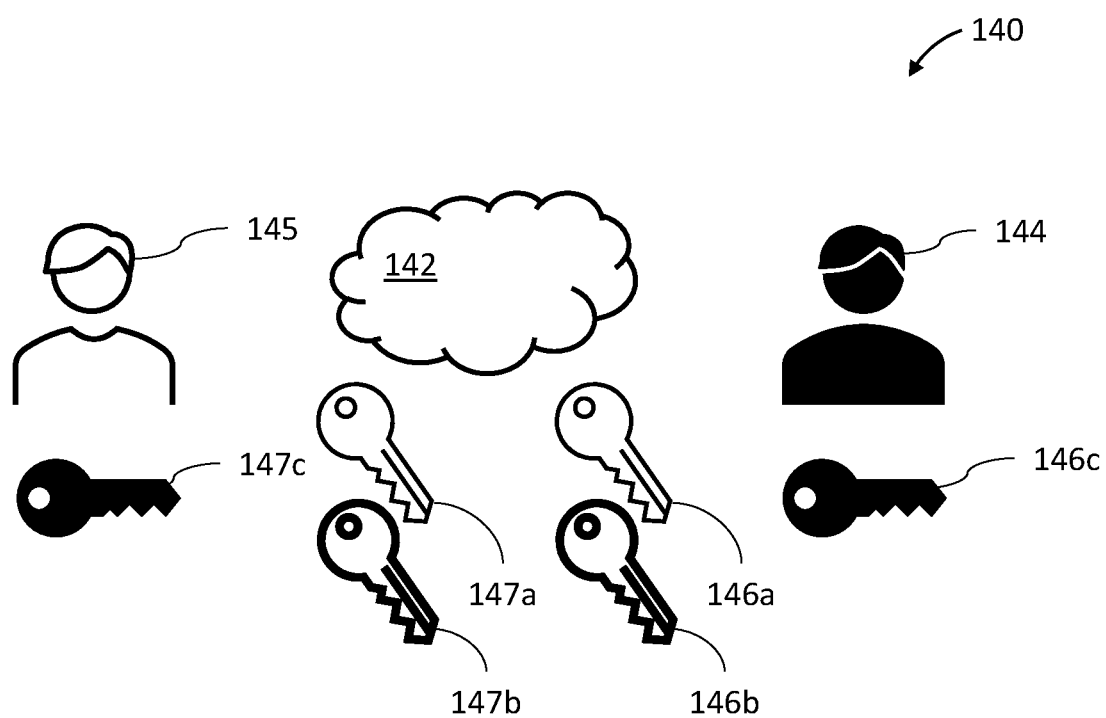

FIG. 1E illustrates yet another exemplary multi-key environment 140, wherein each entity has access to a unique secret key. For example, data owner 144 has access to secret key 146c, while one or more users each has access to a unique secret key (e.g., user 145 has access to unique secret key 147c). Cloud server 242 has different public 146a, 147a and evaluation 146b, 147b keys, associated with the secret keys 146c, 147c of the data owner 144 and the user 145, respectively. Environment 240 solves many of the concerns described above with respect to environments 110-130. For example, there is no need to for any non-collusion assumptions among the partis, and each party can decrypt results independently. However, the solution of environment 240 involves increased computational overhead, slower times, and higher bandwidth consumption.

Figure 2:
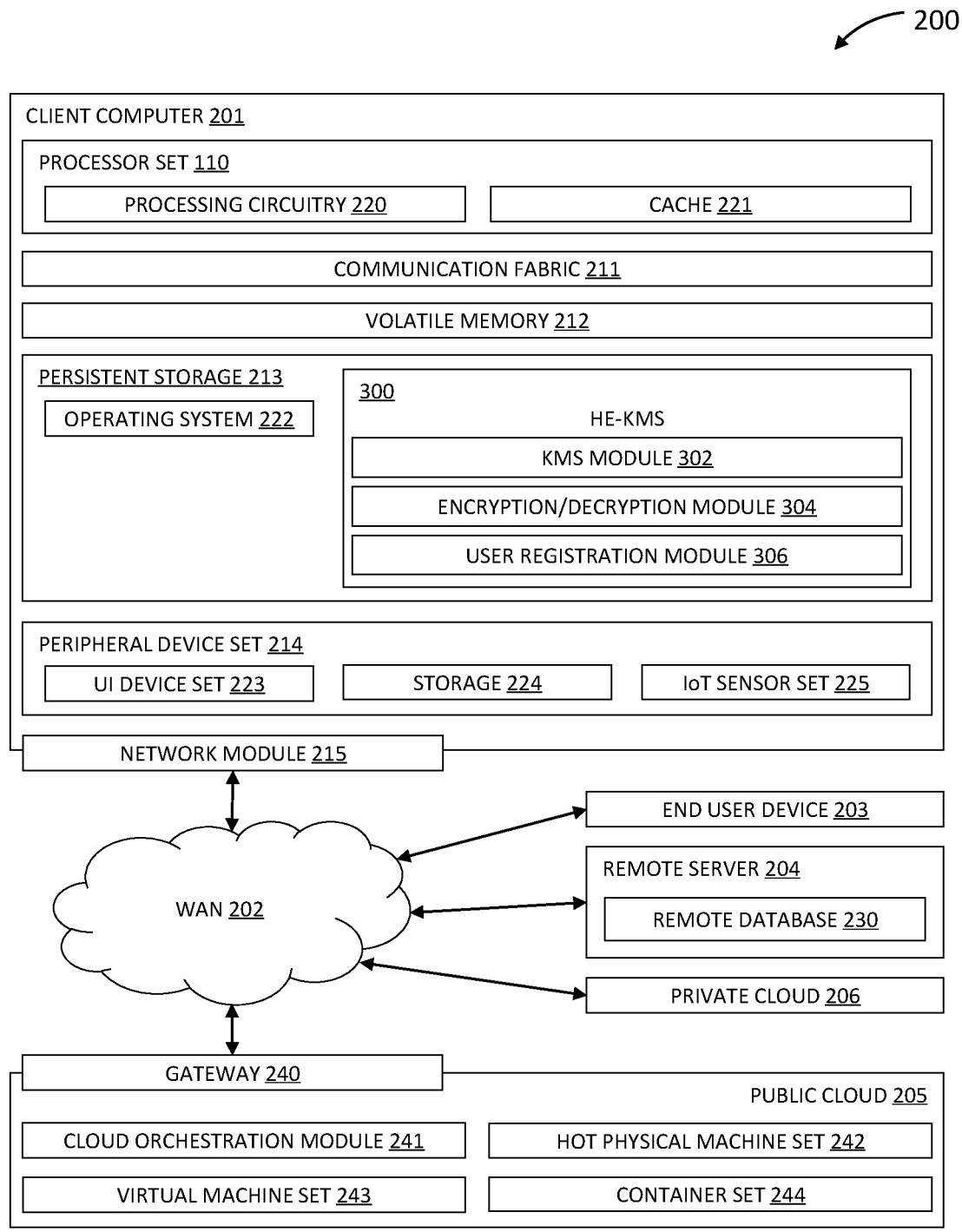
FIG. 2 shows a block diagram of an exemplary key management system (KMS) configured to ensure the security of encryption keys used in homomorphic encryption (HE) schemes.

Reference is now made to FIG. 2, which shows a block diagram of an exemplary computing environment 200, containing an example of an environment for the execution of at least some of the computer code involved in performing the inventive methods, such as an HE key management system (HE-KMS) 300, comprising, e.g., a KMS module 302, an encryption/decryption module 304, and a user registration module 306. In addition to HE-KMS 300, computing environment 200 includes, for example, a computer 201, a wide area network (WAN) 202, an end user device (EUD) 203, a remote server 204, a public cloud 205, and/or a private cloud 206. In this example, computer 201 includes a processor set 210 (including processing circuitry 220 and a cache 221), a communication fabric 211, a volatile memory 212, a persistent storage 213 (including an operating system 222 and HE-KMS 300, as identified above), a peripheral device set 214 (including a user interface (UI), a device set 223, a storage 224, and an Internet of Things (IoT) sensor set 225), and a network module 215. Remote server 204 includes a remote database 230. Public cloud 205 includes a gateway 240, a cloud orchestration module 241, a host physical machine set 242, a virtual machine set 243, and a container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one or more computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in HE-KMS 300 or in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read-only memory (ROM), but typically at least a portion of the persistent storage allows writing of data, deletion of data and re-writing of data. Some familiar forms of persistent storage include magnetic disks and solid-state storage devices. Operating system 222 may take several forms, such as various known proprietary operating systems or open source Portable Operating System Interface type operating systems that employ a kernel. The code included in HE-KMS 300 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as a network interface controller (NIC), a modem, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through the hardware included in network module 215.

WAN 202 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way. EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3A:
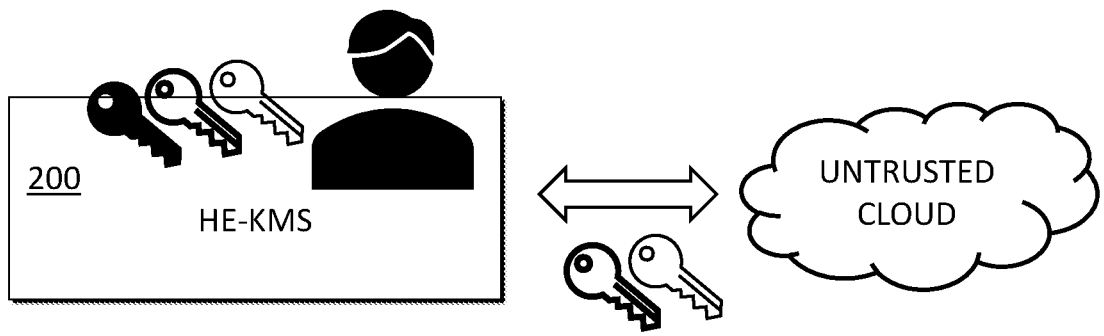
FIGS. 3A-3C illustrate three possible locations for key management system (KMS) within the context of cryptographic environments.
Figure 3B:
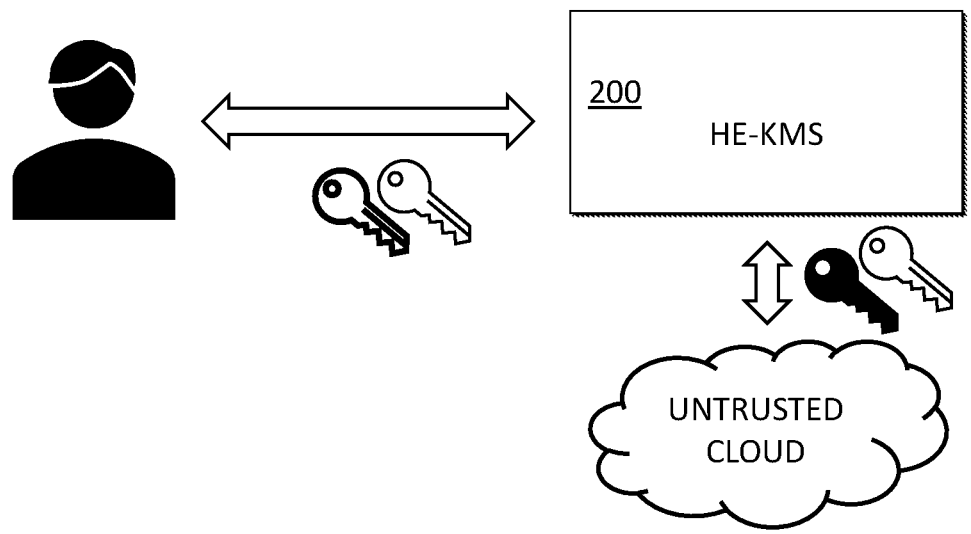
Figure 3C:
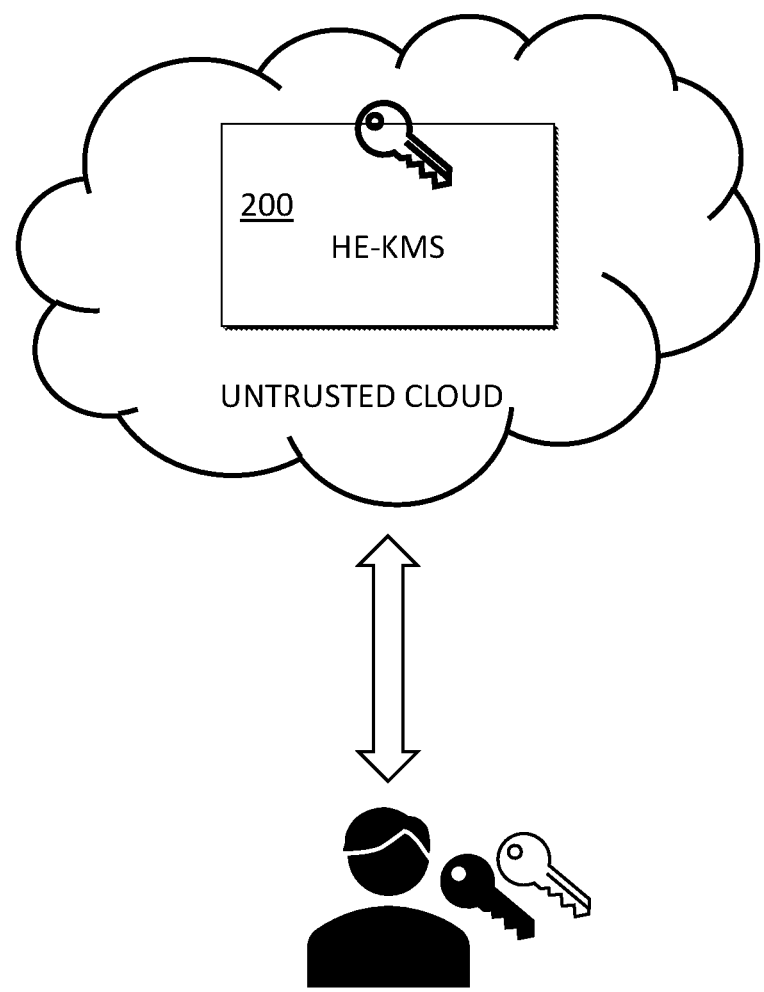

FIGS. 3A-3C show three possible locations for one or more components of key management system (KMS) 300 within the context of cryptographic environments, such as one or more of the environments depicted in FIGS. 1A-1E. FIG. 3A locates all or part of HE-KMS 300 on the user premises. Thus, the user generally has direct access to all keys, and no third party has access to the secret key without user permission. A potential disadvantage of this approach is that the user is responsible for uploading the public and evaluation keys to the cloud server, and for providing the secret key to third-party users, which may require a significant amount of bandwidth.

FIG. 3B shows an alternative solution, wherein HE-KMS 300 is located in whole or part at a proxy site controlled solely by the user, in closer proximity to the cloud server. Here, the secret key never leaves the user's possession, while uploading the public and evaluation keys requires shorter times and less bandwidth.

FIG. 3C shows a third option, wherein HE-KMS 300 is located in whole or part within the cloud server itself. This configuration assumes a certain level of trust that the cloud server would not collude with any third party user to divulge the secret key located therein.

In some embodiments, the present technique provides for a KMS protocol intended for HE-schemes (termed herein HE-KMS), such as HE-KMS 300 depicted in FIG. 2, which incorporates all key management capabilities found in typical KMS designs for cryptographic schemes.

Specifically, during a registration stage, the HE-KMS generates a key-seed s (which may be of a size of at least 256-bits) associated with an authenticate user, e.g., using a cryptographic random number generator (CRNG). The HE-KMS then sends s (e.g., over a secure communication channel, such as TLS 1.3) to a trusted key management function, such as any common KMS function. The trusted key management function then generates a new symmetric encryption key ($k_{aes}$) and associates it with the authenticated user. The HE-KMS then uses $k_{aes}$ to encrypt s and returns the encryption blob Es=enc($k_{aes}$, S) to the user. The HE-KMS may then use the encryption blob Es to generate an HE key package, comprising secret key sk, public key pk, and evaluation key ek. The HE-KMS may then upload and store Es, and the public keys pk, ek to an untrusted public cloud, for use in runtime. The HE-KMS may then delete Es and HE keys sk, pk, ek.

During a usage stage, e.g., when a user wishes to use the HE scheme for computational purposes, HE-KMS may obtain pk associated with the user from the untrusted cloud. The user may then use pk to encrypt private data Ed=$HE_{Enc}$(pk, data). The user sends encrypted private data Ed to the untrusted cloud for computational purposes, e.g., to be inferenced by a machine learning model stored on the cloud, and receives back encrypted computational results $c_{res}$, $c_{res}$=HE$_{Eval}$(f, ek, data).

To decrypt $c_{res}$, HE-KMS obtain Es associated with the user from the untrusted cloud, and send it to the trusted key management function. The trusted key management function uses $K_{aes}$ to decrypt Es, and to return the original key-seed s, s=dec($k_{aes}$,Es) to the HE-KMS. The HE-KMS can then regenerate sk from s, and use sk to decrypt the results $m_{res}$, $m_{res}$=HE$_{Dec}$(sk, $c_{res}$). Subsequently, the HE-KMS deletes Es, s and all the cryptographic keys sk, pk, ek.

Figure 4A:
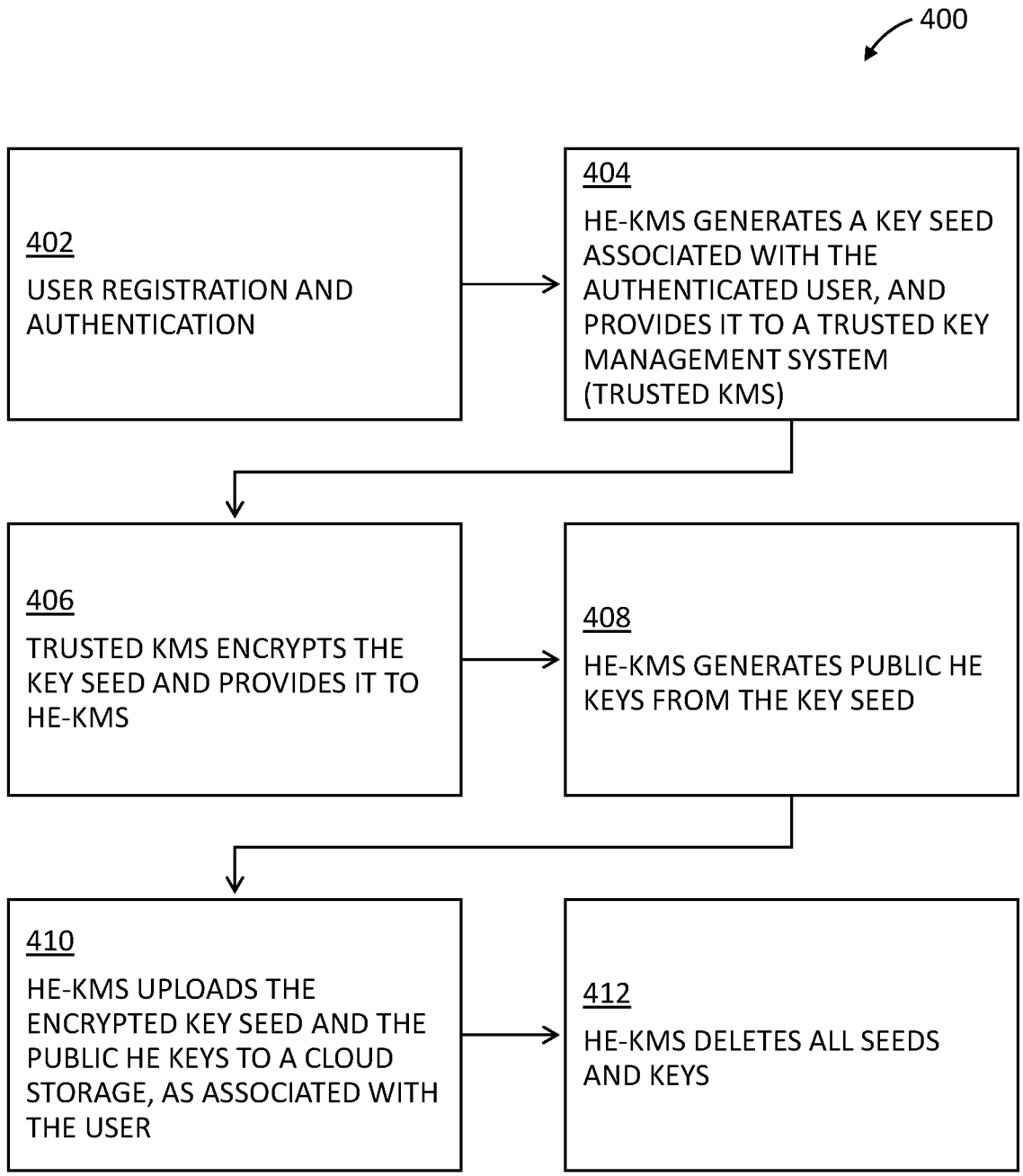
FIG. 4A is a flowchart of the functional steps in a method for implementing a registration stage, using an HE-KMS of the present invention configured to ensure the security of encryption keys used in homomorphic encryption (HE) schemes, according to some embodiments of the present disclosure.

The instructions of HE-KMS 300 will now be discussed with reference to the flowchart of FIG. 4A, which illustrates a method 400 for implementing a registration stage using an HE-KMS of the present invention configured to ensure the security of encryption keys used in homomorphic encryption (HE) schemes, according to some embodiments of the present disclosure. The steps of method 400 will be discussed with continued reference to FIG. 5A, which illustrates an exemplary HE scheme environment 500 in which the registration steps of method 400 may be performed, e.g., using exemplary HE-KMS 300 shown in FIG. 2.

The various steps of method 400 may either be performed in the order they are presented or in a different order (or even in parallel), as long as the order allows for a necessary input to a certain step to be obtained from an output of an earlier step. In addition, the steps of method 400 may be performed automatically (e.g., by HE-KMS 300 of FIG. 2), unless specifically stated otherwise.

Method 400 begins in step 402, when a user 502 submits a registration request and the required user credentials to user registration module 306 of HE-KMS 300. The instructions of user registration module 306 cause HE-KMS 300 to authenticates user 502 and transmit a valid user profile to KMS module 302.

In some embodiments, KMS module 302 may form a part or component of HE-KMS 300, or may form an external module or function in communication with HE-KMS 300, e.g., through communication fabric 211.

In step 404, HE-KMS 300 generates a key-seed s (which may be of a size of at least 256-bits) associated with user 502, e.g., using a cryptographic random number generator (CRNG). HE-KMS 300 then sends s (e.g., over a secure communication channel, such as TLS 1.3) to a trusted key management function, such as KMS module 302.

In some embodiments, HE-KMS 300 generates a secret key sk instead of key-seed s, and sends secret key sk to KMS module 302, wherein KMS module 302 encrypts the secret key sk.

In step 406, KMS module 302 generates a symmetric encryption key $k_{aes}$ and associates it with user 502. In some embodiments, $k_{aes}$ may already exist for user 502, in which case, KMS may reuse the existing key. In some embodiments, KMS module 302 then uses $k_{aes}$ to encrypt s (or secret key sk, as the case may be), and returns an encryption blob Es, wherein Es=enc($k_{aes}$, s) to encryption/decryption module 304 of HE-KMS 300.

In step 408, the instructions of encryption/decryption module 304 may cause HE-KMS 300 to use the encryption blob Es to generate a set of HE keys, comprising secret key sk, public key pk, and evaluation key ek. When in step 404, HE-KMS 300 provides a secret key sk rather than a key-seed, HE-KMS does not need to re-generate secret key sk from key-seed s in step 408.

In step 410, HE-KMS 300 may upload and store encryption blob Es, as well as the public keys pk, ek to an untrusted cloud storage 504, for use during runtime. In cases where user 502 has access to secret key sk, it is possible to upload and store only (Es, ek), thus preventing the need to also store public key pk, which in many HE schemes can be generated directly from secret key sk.

In optional step 412, the instructions of encryption/decryption module 304 may cause HE-KMS 300 to delete encryption blob Es and the HE keys sk, pk, ek.

Figure 4B:
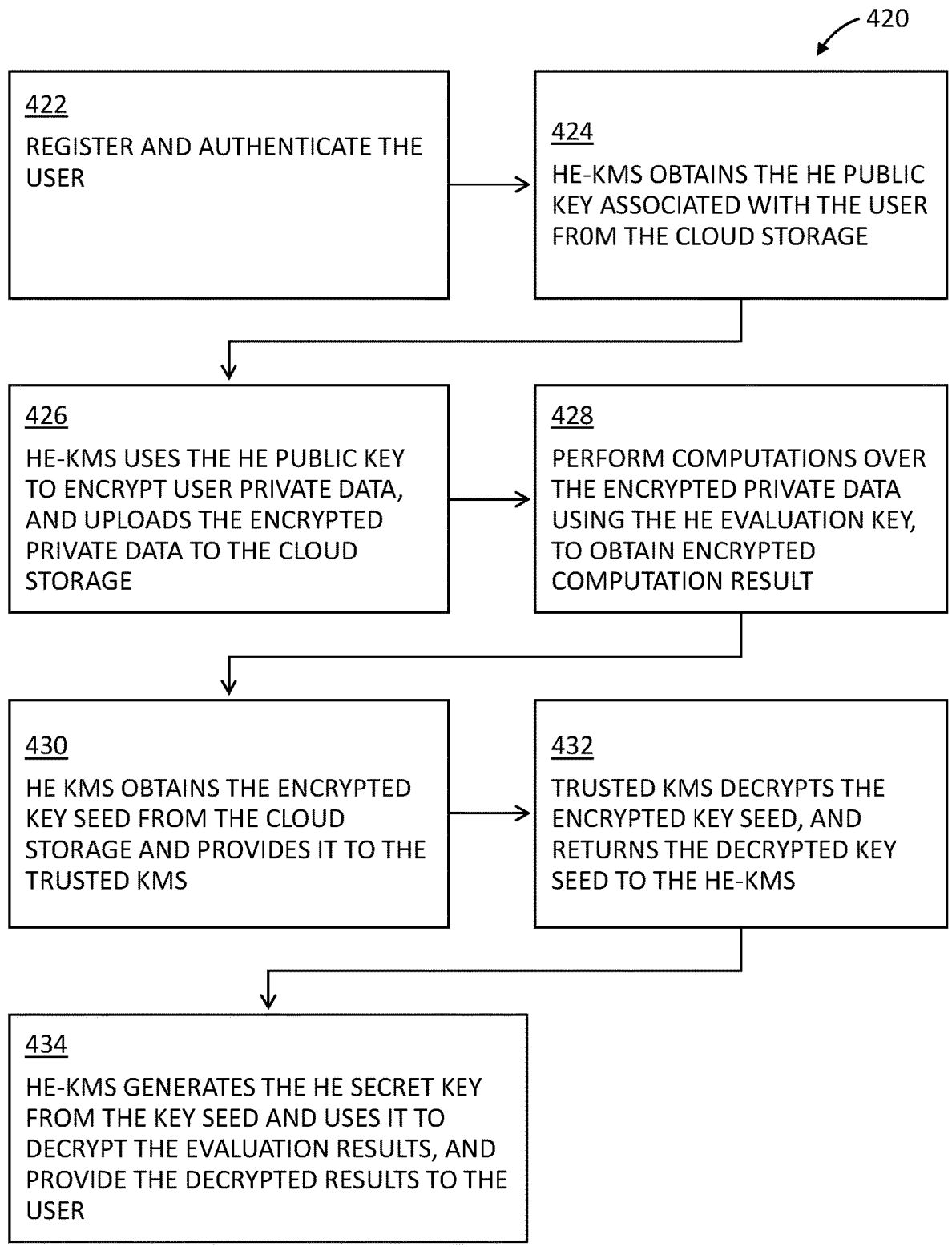
FIG. 4B is a flowchart of the functional steps in a method for implementing a usage stage, using an HE-KMS of the present invention configured to ensure the security of encryption keys used in homomorphic encryption (HE) schemes, according to some embodiments of the present disclosure.

The instructions of HE-KMS 300 will now further be discussed with reference to the flowchart of FIG. 4B, which illustrates a method 420 for implementing a usage stage, using an HE-KMS of the present invention configured to ensure the security of encryption keys used in homomorphic encryption (HE) schemes, according to some embodiments of the present disclosure. The steps of method 420 will be discussed with continued reference to FIGS. 5B-5C, which illustrate exemplary HE scheme environment 500 in which the encryption (FIG. 5B) and decryption (FIG. 5C) portions of method 420 may be performed, e.g., using exemplary HE-KMS 300 shown in FIG. 2.

The various steps of method 420 may either be performed in the order they are presented or in a different order (or even in parallel), as long as the order allows for a necessary input to a certain step to be obtained from an output of an earlier step. In addition, the steps of method 420 may be performed automatically (e.g., by HE-KMS 300 of FIG. 2), unless specifically stated otherwise.

Method 420 begins in step 422, when user 502 submits a usage request and the required user credentials to user registration module 306 of HE-KMS 300. The instructions of user registration module 306 cause HE-KMS 300 to authenticates user 502.

In some embodiments, user 502 may wish to use a publicly-available trained machine learning model, by inferencing the model on private data uploaded by user 502. User 502 may wish to maintain the privacy of its private data, by encrypting it and inferencing the training machine learning model homomorphically, e.g., within the context of HE scheme environment 500.

In step 424, HE-KMS obtains the public key pk from cloud storage 504.

In step 426, the instructions of encryption/decryption module 304 may cause HE-KMS 300 to use public key pk to encrypt private data from user 502, to obtain encrypted private data Ed, wherein Ed=HE$_{Enc}$(pk, data).

In step 428, encrypted private data Ed may be uploaded to cloud storage 504 for computational purposes, e.g., to be inferenced by a machine learning model stored on cloud storage 504. The results of this step a returned as encrypted computational results $c_{res}$, wherein $c_{res}$=HE$_{Eval}$(f, ek, data).

In step 430 begins a decryption portion of method 420. In some embodiments, HE-KMS 300 obtain encryption blob Es associated with user 502 from cloud storage 504, and sends it to KMS module 302.

In step 432, KMS module 302 uses $K_{aes}$ (generated in step 406 of method 400) to decrypt Es, and to return the original key-seed s, s=dec($k_{aes}$,Es), to HE-KMS 300.

In step 434, HE-KMS 300 then regenerates secret key sk from key-seed s, and uses secret key sk to decrypt $c_{res}$, to obtain decrypted result $m_{res}$, wherein $m_{res}$=HE$_{Dec}$(sk, $c_{res}$). Finally, HE-KMS 300 may provide decrypted results $m_{res}$ deletes to user 502.

In some cases, where a set of HE keys is expected to be used only once (i.e., as an ephemeral key set), it is possible to skip steps 410 and 412 of method 400, i.e., using secret key sk and deleting it after the single usage. This approach eliminates the caching steps 410 and 412 of method 400 of the pre-generated HE keys, thus reducing uploading time and bandwidth requirements.

Figure 4C:
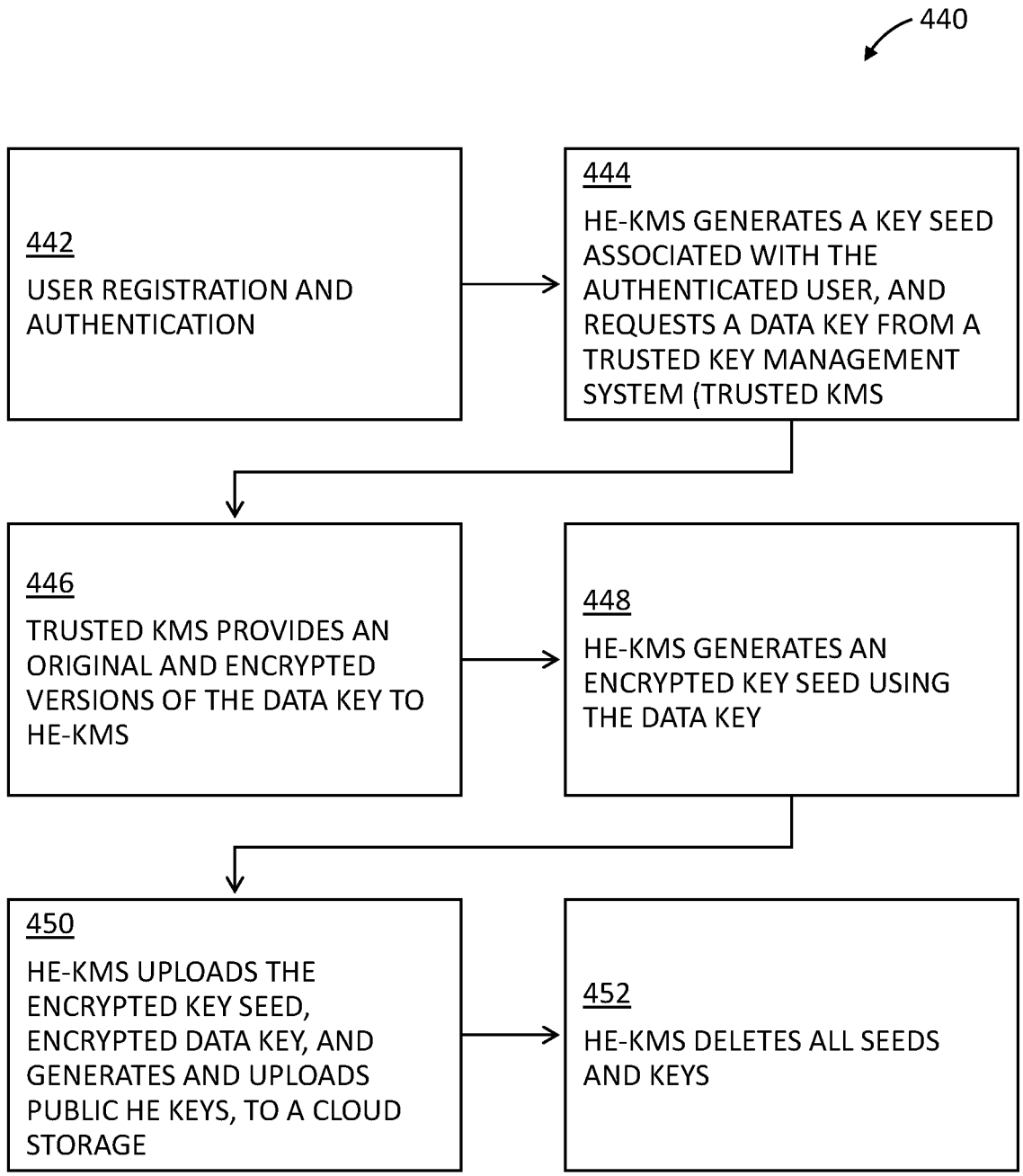
FIG. 4C is a flowchart of the functional steps in a method for implementing a registration stage with envelope encryption, using an HE-KMS of the present invention configured to ensure the security of encryption keys used in homomorphic encryption (HE) schemes, according to some embodiments of the present disclosure.

The instructions of HE-KMS 300 will now be discussed with reference to the flowchart of FIG. 4C, which illustrates a method 440 for implementing a registration stage using an HE-KMS of the present invention configured to ensure the security of encryption keys used in homomorphic encryption (HE) schemes, according to some embodiments of the present disclosure. The registration stage of method 440 may be implemented in cases where KMS module 302 may be located externally to HE-KMS and may not be trusted with the key-seed or any of the HE keys themselves.

Figure 5A:
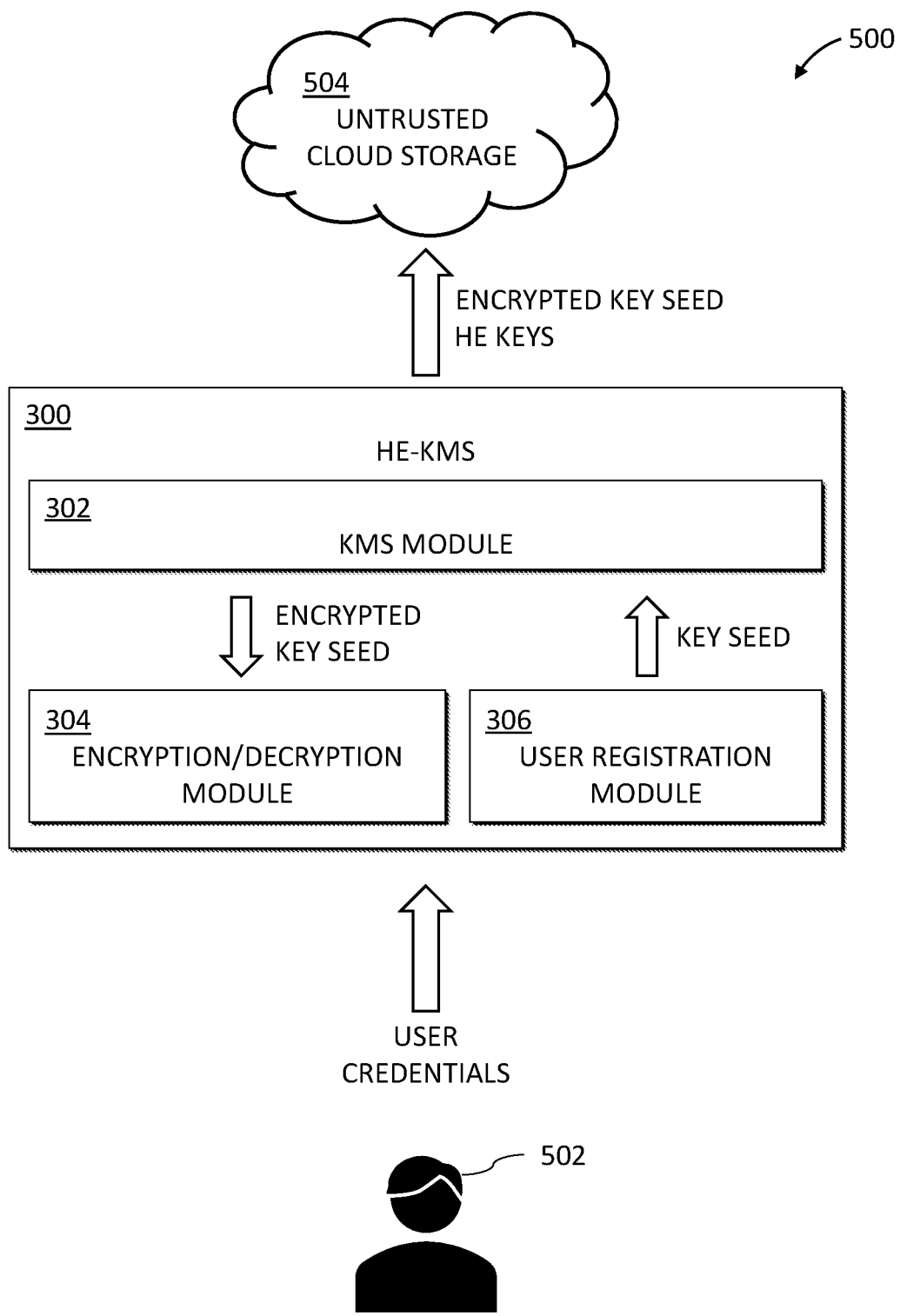
FIGS. 5A-5C illustrate an exemplary HE scheme environment in which the registration steps of the various methods of the present disclosure may be performed, according to some embodiments of the present disclosure.
Figure 5B:
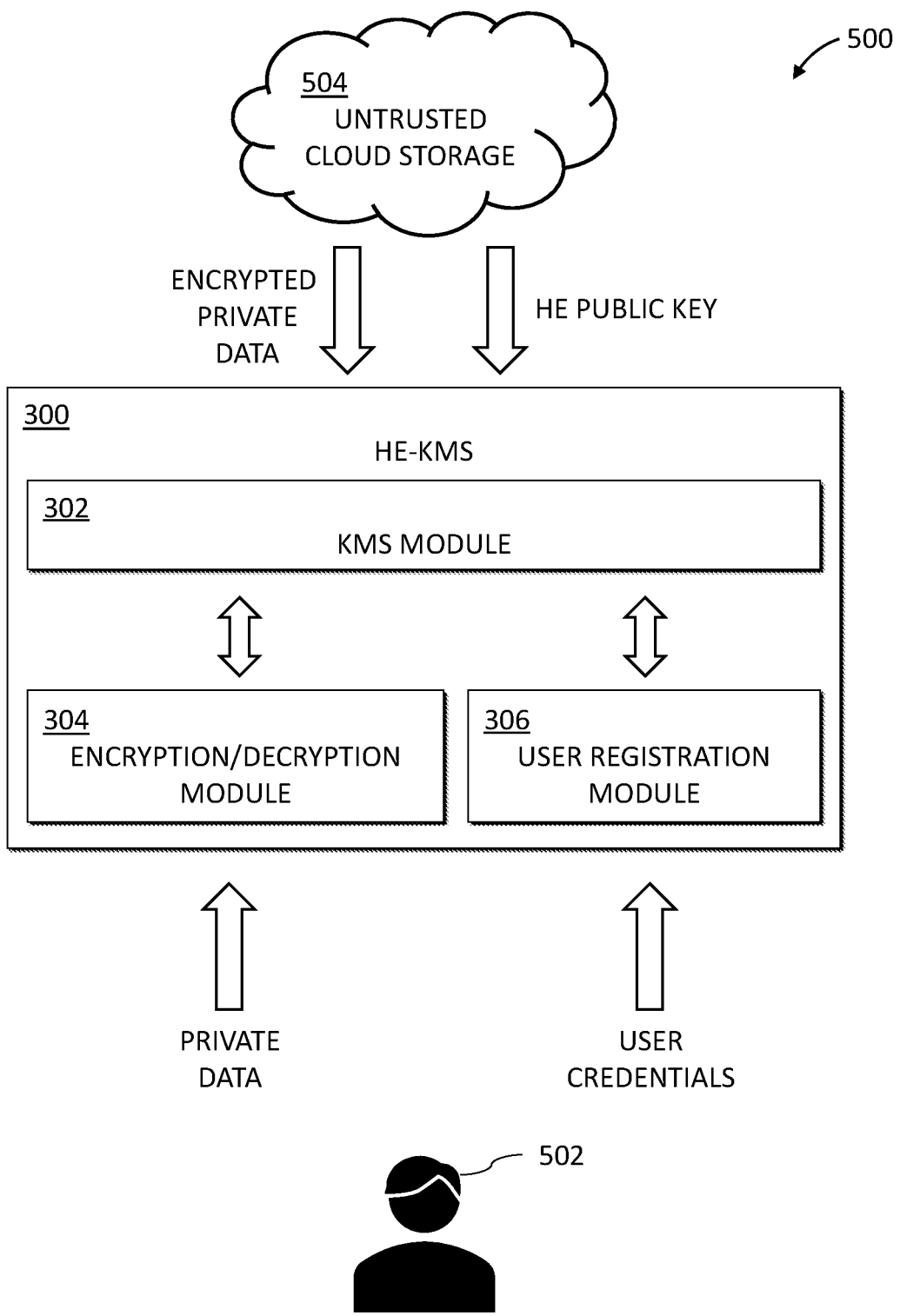
Figure 5C:
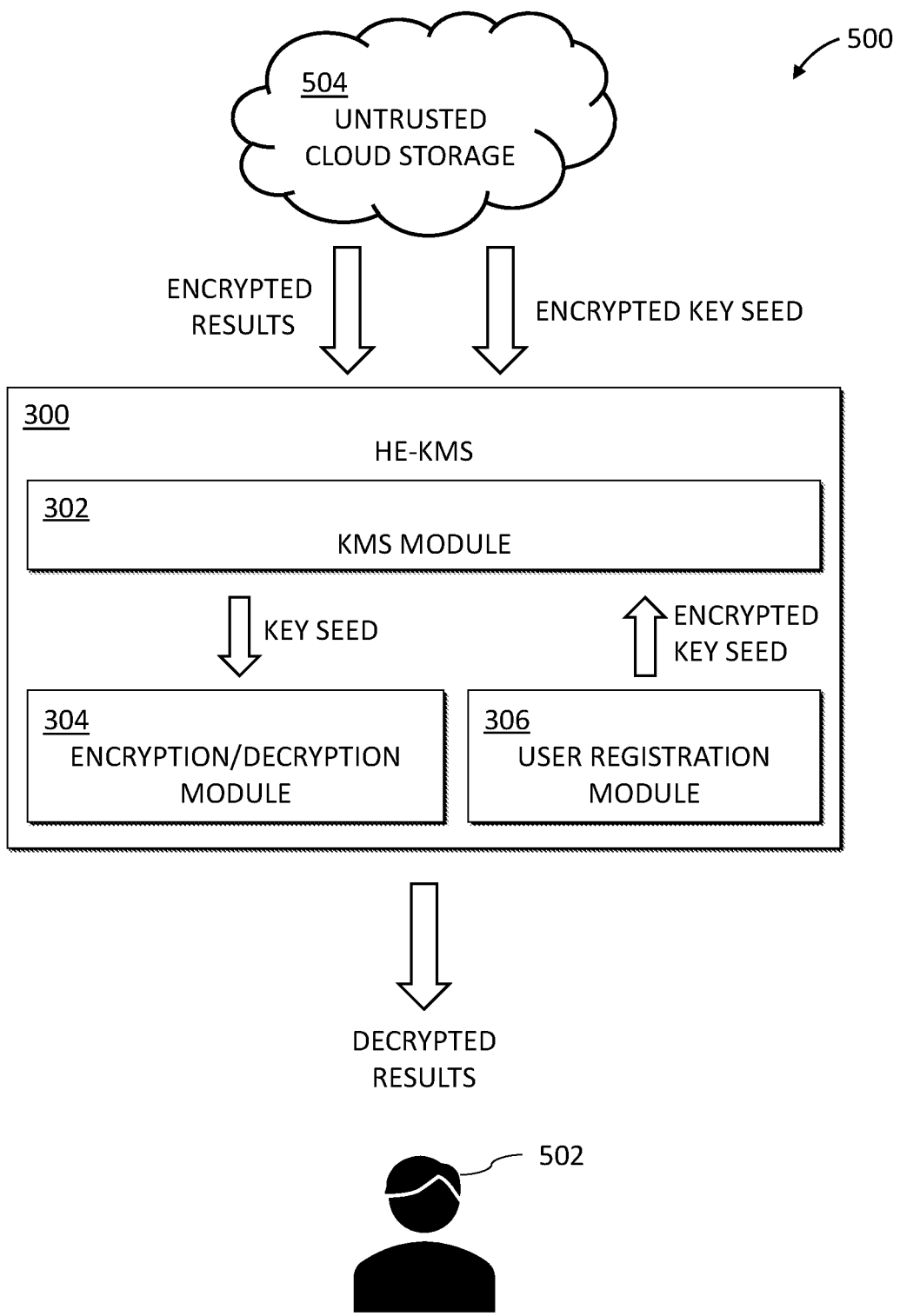

The steps of method 440 will be discussed with continued reference to FIG. 5A, which illustrates an exemplary HE scheme environment 500 in which the registration steps of method 440 may be performed, e.g., using exemplary HE-KMS 300 shown in FIG. 2.

The various steps of method 440 may either be performed in the order they are presented or in a different order (or even in parallel), as long as the order allows for a necessary input to a certain step to be obtained from an output of an earlier step. In addition, the steps of method 440 may be performed automatically (e.g., by HE-KMS 300 of FIG. 2), unless specifically stated otherwise.

Method 440 begins in step 442, when a user 502 submits a registration request and the required user credentials to user registration module 306 of HE-KMS 300. The instructions of user registration module 306 cause HE-KMS 300 to authenticates user 502 and transmit a valid user profile to KMS module 302.

In step 444, HE-KMS 300 generates a key-seed s (which may be of a size of at least 256-bits) associated with user 502, e.g., using a cryptographic random number generator (CRNG), and requests a data key dk from KMS module 302.

In step 446, KMS module 302 generates a symmetric encryption key $k_{aes}$ and associates it with user 502. In some embodiments, $k_{aes}$ may already exist for user 502, in which case, KMS may reuse the existing key.

In some embodiments, KMS module 302 then uses $k_{aes}$ to encrypt data key dk, and returns data key dk and an encryption blob Ek, wherein Ek=enc($k_{aes}$,dk) to encryption/decryption module 304 of HE-KMS 300.

In step 448, the instructions of encryption/decryption module 304 may cause HE-KMS 300 to use the encryption data key dk encrypt key-seed s to obtain Es, wherein Es=enc$_{dk}$(s).

In step 450, HE-KMS 300 may generate from key-seed s a set of HE keys sk, pk, ek. HE-KMS 300 may then upload and store key-seed s, encrypted key-seed Es, encryption blob Ek, as well as the public keys pk, ek to untrusted cloud storage 504, for use during runtime.

In optional step 452, the instructions of encryption/decryption module 304 may cause HE-KMS 300 to delete key-seed s, encrypted key-seed Es, encryption blob Ek and the HE keys sk, pk, ek.

Figure 4D:
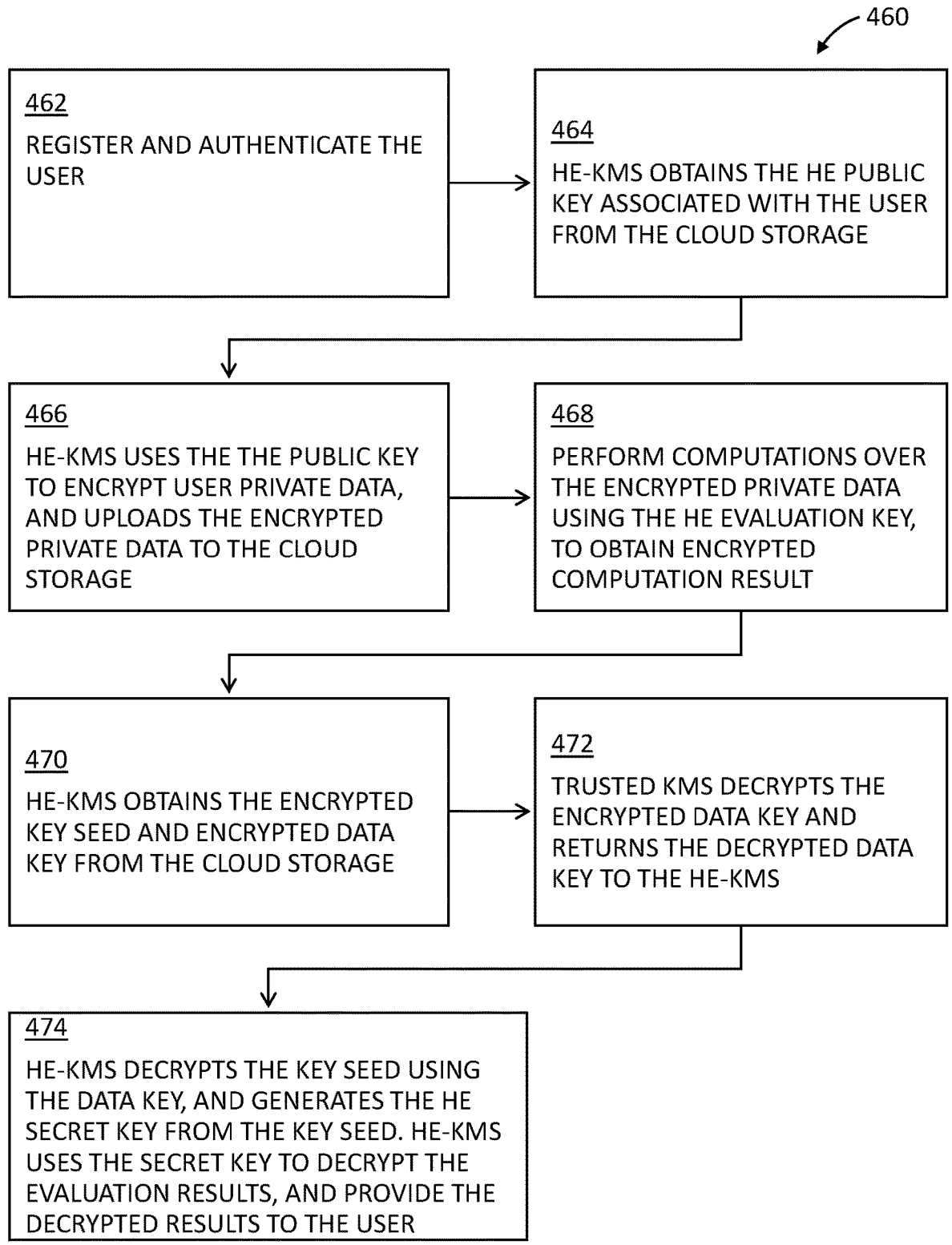
FIG. 4D is a flowchart of the functional steps in a method for implementing a usage stage with envelope encryption, using an HE-KMS of the present invention configured to ensure the security of encryption keys used in homomorphic encryption (HE) schemes, according to some embodiments of the present disclosure.

The instructions of HE-KMS 300 will now further be discussed with reference to the flowchart of FIG. 4D, which illustrates a method 460 for implementing a usage stage, using an HE-KMS of the present invention configured to ensure the security of encryption keys used in homomorphic encryption (HE) schemes, according to some embodiments of the present disclosure. The steps of method 460 will be discussed with continued reference to FIGS. 5B-5C, which illustrate exemplary HE scheme environment 500 in which the encryption (FIG. 5B) and decryption (FIG. 5C) portions of method 460 may be performed, e.g., using exemplary HE-KMS 300 shown in FIG. 2.

The various steps of method 460 may either be performed in the order they are presented or in a different order (or even in parallel), as long as the order allows for a necessary input to a certain step to be obtained from an output of an earlier step. In addition, the steps of method 460 may be performed automatically (e.g., by HE-KMS 300 of FIG. 2), unless specifically stated otherwise.

Method 460 begins in step 462, when user 502 submits a usage request and the required user credentials to user registration module 306 of HE-KMS 300. The instructions of user registration module 306 cause HE-KMS 300 to authenticates user 502.

In some embodiments, user 502 may wish to use a publicly-available trained machine learning model, by inferencing the model on private data uploaded by user 502. User 502 may wish to maintain the integrity of its private data, by encrypting it and inferencing the training machine learning model homomorphically, e.g., within the context of HE scheme environment 500.

In step 464, HE-KMS obtains the public key pk from cloud storage 504.

In step 466, the instructions of encryption/decryption module 304 may cause HE-KMS 300 to use public key pk to encrypt private data from user 502, to obtain encrypted private data Ed, wherein Ed=HE$_{Enc}$(pk, data).

In step 468, encrypted private data Ed may be uploaded to cloud storage 504 for computational purposes, e.g., to be inferenced by a machine learning model stored on cloud storage 504. The results of this step a returned as encrypted computational results $c_{res}$, wherein $c_{res}$=HE$_{Eval}$(f, ek, data).

In step 470 begins a decryption portion of method 460. In some embodiments, HE-KMS 300 obtain encrypted key-seed Es and encryption blob EK associated with user 502 from cloud storage 504. HE-KMS then sends encryption blob Ek to KMS module 302.

In step 472, KMS module 302 uses $K_{aes}$ (generated in step 446 of method 440) to decrypt Ek, and to return the data key dk, wherein dk=dec($k_{aes}$(Ek)), to HE-KMS 300.

In step 474, HE-KMS 300 decrypts key-seed s using data key dk, by s=dec(dk(Es)), and uses key-seed s to regenerate secret key sk. HE-KMS then uses secret key sk to decrypt $c_{res}$, to obtain decrypted result $m_{res}$, wherein $m_{res}$=HE$_{Dec}$(sk, $c_{res}$). Finally, HE-KMS 300 may provide decrypted results $m_{res}$ deletes to user 502.

In some embodiments, HE-KMS 300 or any component part thereof, such as KMS module 302, may be implemented using an HSM, which restricts key access to the minimum needed. As noted above, an HSM is a hardware device that securely stores, manages, and uses cryptographic keys for encryption, decryption, and digital signature operations. An HSM can be in the form of a digital plug-and-play device or a stand-alone unit, and may be connected to cloud servers physically or through a network, e.g., using a secure network protocol. To guarantee the privacy and authenticity of the secret keys stored in an HSM, it must adhere to security standards and protocols, such as FIPS 140-2. These may require using secure-cryptoprocessor chips and tamper-evident, tamper-resistant, and tamper-responsive features, which render the HSM inoperable if any tampering is detected. The advantages of using an HSM are clear: neither the users nor the cloud ever get to see the HE secret keys, which never leave the HSM. The solution still relies on trust the HSM. However, unlike a typical KMS, which is often a software tool that runs on commodity servers, an HSM comprises hardware that is compliant with various security standards.

Figure 6:
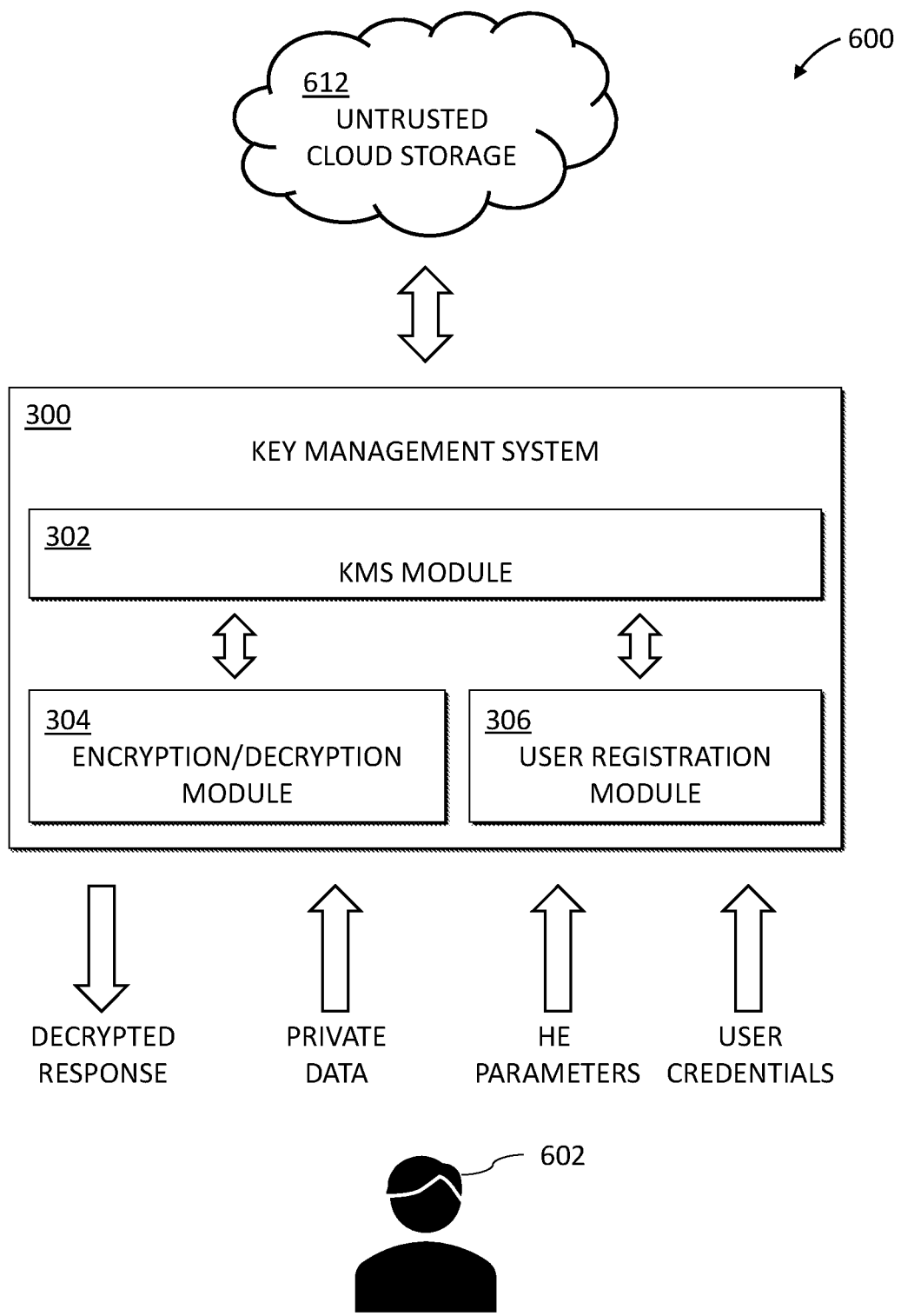
FIG. 6 illustrates an exemplary HE scheme environment in which the present KMS may be implemented, to manage and protect the security of HE keys.

FIG. 6 illustrates an exemplary HE scheme environment 600 in which an embodiment of the present HE-KMS design may be implemented, to manage and protect the security of HE keys.

In some embodiments, the embodiment presented in FIG. 6 may be implemented using an HSM. As noted above, an HSM is a hardware device that securely stores, manages, and uses cryptographic keys for encryption, decryption, and digital signature operations. An HSM can be in the form of a digital plug-and-play device or a stand-alone unit, and may be connected to cloud servers physically or through a network, e.g., using a secure network protocol.

In some embodiments, the HE-KMS embodiment depicted n FIG. 6 comprises the following three functionalities:

1. Registration: The registration functionality (implemented, e.g., by exemplary user registration module 306 of HE-KMS 300 shown in FIG. 2), receives, as input, user credentials of user 602, and authenticates user 602 by generating a user profile uProfile.
2. Key generation: The key generation functionality (implemented, e.g., by exemplary KMS module 302 of HE-KMS 300 shown in FIG. 2), receives, as input, HE parameters provides by user 602 (e.g., HE scheme name, HE key sizes, modulus chain, etc.), as well as the authenticated user 602 profile uProfile. The key generator functionality generates new HE keys as may be required:
  Secret key sk.
  Public key pk.
  Evaluation key ek, which may include, but is not limited to, multiplication, bootstrapping, or rotation keys).

The generated keys are associated with the authenticated user uProfile.

3. Encryption/decryption: The encryption/decryption functionality (implemented, e.g., by exemplary encryption/decryption module 304 of HE-KMS 300 shown in FIG. 2), receives an encrypted message encryptedData associated with private data provided by user 602, and returns decrypted results to user 602.

HE-KMS 300 (which may be implemented using an HSM) may be used within environment 600 in conjunction with a cloud-based service offered by a data owner to third-party users, such as user 602, over cloud server 612, which may be used for storing data, models, and/or HE keys. Cloud server 612 may be any computer system available for use by multiple entities that provides on-demand availability of computer system resources and/or other computer capabilities.

As detailed herein with reference to FIGS. 3A-3C, in this scenario, HE-KMS 300 may be located on the premises of user 602. Alternatively, HE-KMS 300 may be located at a proxy site controlled by user 602. In other cases, HE-KMS 300 may be located within an untrusted cloud server 612, wherein there is assumed a certain level of trust that the cloud server would not collude with any third party user to divulge the secret key located therein. In yet other embodiments, various components of HE-KMS 300 may be located over several locations, e.g., some components can be implemented on the user side while others are implemented on an untrusted cloud site.

The data owner can upload and store on cloud server 612 secure data, e.g., a secure database or a trained machine learning model. The data owner can then allow a third-party user 602 to execute a desired function over the secure data, such as run a query over the secure database, or inference the machine learning model over private input data provided by the user.

Using HE-KMS 300, a third-party user 602 can authenticate itself as a valid user, and generate a set of HE keys associated with its user profile. User 602 can then upload, encrypt, and evaluate private input data to cloud server 612 using the generated HE keys. The encrypted evaluation results can then be decrypted and provided to user 602.

Throughout this usage scenario, the secret key generated for user 602 is maintained and controlled solely by HE-KMS 300, and user 602 does not have access to the secret key. This reflects a reduction in the attack surface, because only HE-KMS 300 has access to the secret key. In addition, because the public and evaluation keys are stored on HE-KMS 300 (which may be at least partially located on cloud server 612), they can be transmitted directly from HE-KMS 300 to cloud server 612 without involving the data owner, which reduces overall bandwidth consumption.

Figure 7:
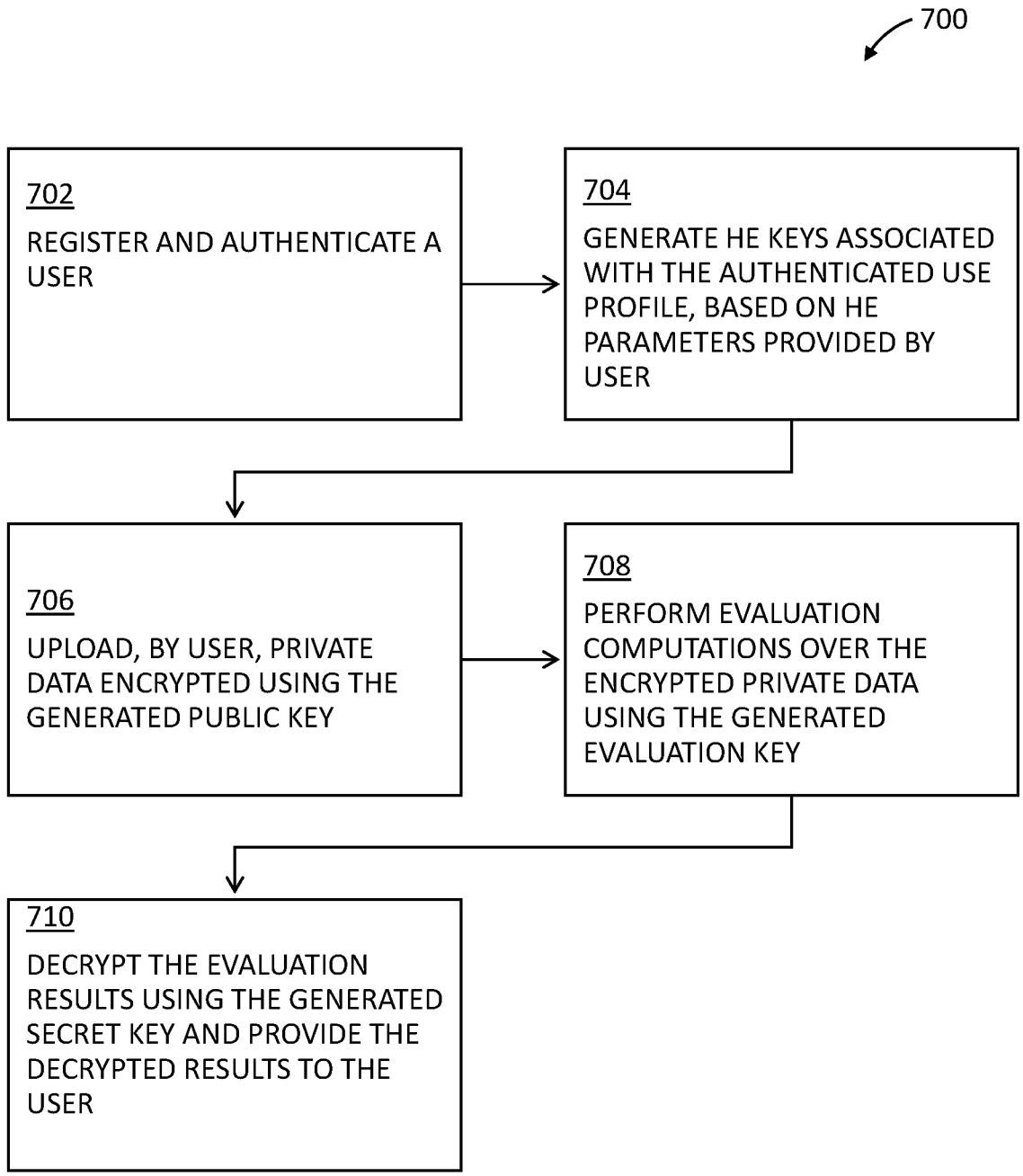
FIG. 7 illustrates a method for using a key management system (KMS) configured to ensure the security of encryption keys used in homomorphic encryption (HE) schemes.

The instructions of HE-KMS 300 will now be discussed with continued reference to environment 600 in FIG. 6, and to the flowchart of FIG. 7, which illustrates a method 700 for using a key management system (KMS) configured to ensure the security of encryption keys used in homomorphic encryption (HE) schemes, according to some embodiments of the present disclosure.

The various steps of method 700 may either be performed in the order they are presented or in a different order (or even in parallel), as long as the order allows for a necessary input to a certain step to be obtained from an output of an earlier step. In addition, the steps of method 700 may be performed automatically (e.g., by HE-KMS 300 of FIG. 2), unless specifically stated otherwise.

At a high level, performing method 700 as implemented using HE-KMS 300, a user 602 begins by submitting a registration request to user registration module 306 of HE-KMS 300. User registration module 306 authenticates the user and transmits a valid user profile uProfile to KMS module 302, which generates the necessary HE keys. The generated HE keys may be stored locally in plaintext or encrypted at some external storage location.

User 602 can then upload private data, which will be encrypted by encryption/decryption module 304 using the generated HE keys. After encryption, user 602 can execute any desired function over the encrypted uploaded private data, such as inference a machine learning model over the input data provided by user 602. The results of the evaluation may be decrypted by encryption/decryption module 304 and provided to user 602.

Method 700 begins in step 702, when a user 602 uses user registration module 306 of HE-KMS 300 to provide user credentials to HE-KMS 300. The instructions of user registration module 306 then cause HE-KMS 300 to authenticates user 602, and to return a valid user profile uProfile. In some embodiments, user 602 may communicate with HE-KMS 300 over secured communication lines.

In step 704, user 602 may invoke the key generation functionality implemented by KMS module 302, by providing to HE-KMS 300 the valid user profile uProfile and a set of relevant HE parameters (e.g., HE scheme name, HE key sizes, modulus chain, etc.). The instructions of KMS module 302 may then cause HE-KMS 300 to generate one or more of the following new HE keys associated with user 602 valid profile uProfile:

Secret key sk, generated, e.g., by a secret key generator submodule of KMS module 302 of HE-KMS 300.

Public key pk, generated, e.g., by a public key generator submodule of KMS module 302 of HE-KMS 300.

Evaluation key ek (which may include, but is not limited to, multiplication, bootstrapping, and/or rotation keys), generated, e.g., by an evaluation key generator submodule of KMS module 302 of HE-KMS 300.

The instructions of KMS module 302 may then cause HE-KMS 300 to store the generated keys sk, pk, ek at a storage location, e.g., persistent storage 213, or untrusted cloud server 612. The stored keys are associated with valid user profile uProfile.

In some embodiments, KMS module 302, including one or more of secret key generator, public key generator, and/or evaluation key generator submodules, may use a storage-space saving process, which only stores an encryption seed s from which HE-KMS 300 can then generate the relevant key in real time as needed. In some embodiments, the encryption seed s may be a 256-bit seed generated using an approved cryptographic random number generator (CRNG) and transmitted over a secure communication line.

In step 706, user 602 may initiate an HE usage instance. User 602 may then authenticate itself to cloud server 612 using valid user profile uProfile. Accordingly, user 602 begins by authenticating itself to HE-KMS 300 using valid user profile uProfile. Alternatively, in cases where the HE keys are stored on cloud server 612, user 602 may authenticate itself to cloud server 612.

In some embodiments, the instructions of KMS module 302 may cause HE-KMS 300 to provide user 602 with public key pk generated in step 704. User 602 may then use public key pk to encrypt one or more a new private data instances $(m_i \ldots m_n)$ to obtain encrypted new private data instances $(c_i \ldots c_n)$. User 602 may then upload encrypted new private data instances $(c_i \ldots c_n)$ to cloud server 612.

Alternatively, user 602 may upload new private data instances $(m_i \ldots m_n)$ to cloud server 612, wherein the instructions of KMS module 302 may cause HE-KMS 300 to provide public key pk directly to cloud server 612, to encrypt new private data instances $(m_i \ldots m_n)$ to obtain encrypted new private data instances $(c_i \ldots c_n)$.

In some embodiments, the new private data instances $(m_i \ldots (m_n)$ are encrypted $(c_i \ldots c_n)$ by performing $c_i = Enc_{pk}(m_i \ldots m_n)$ and stored, e.g., on a cloud server 612.

In step 708, user 602 may use the computational resources of cloud server 612 to perform one or more evaluation computations or functions f over the uploaded encrypted new private data instances $(c_i \ldots c_n)$, using the evaluation key ek generated in step 704.

For example, a trained machine learning classification model may be inferenced over the uploaded encrypted new private data instance $(c_i \ldots c_n)$. The encrypted output results of the evaluation process performed in step 708 are denoted $c_{res}$, and are obtained by performing $c_{res} = Eval_{pk,ek}(f, (c_1, \ldots, c_n))$. In some embodiments, the evaluation process may be performed using the computational resources of cloud server 612, wherein the evaluation key ek may be provided directly to cloud server 612 by HE-KMS 300.

In step 710, upon completion of the evaluation process of step 708, the instructions of encryption/decryption module 304 may cause HE-KMS 300 to decrypt the evaluation results $c_{res}$ to obtain decrypted results $m_{res}$, using secret key sk, by performing $m_{res} = Dec_{sk}(c_{res})$.

In some embodiments, the decrypted evaluation results $m_{res}$ may then be provided to user 602, e.g., over a secure communication line.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially." "essentially." and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
    generating, from a key-seed s associated with a user, a set of homomorphic encryption (HE) keys associated with an HE scheme;
    receiving, from a key management system (KMS) associated with said HE scheme, an encrypted version Es of said key-seed s;
    storing said encrypted version Es of said key-seed s, and said set of HE keys, in an untrusted storage location; and
    at a decryption stage, decrypting an encrypted computation result generated using said HE scheme, by:
        (i) recalling, from said untrusted storage location, said encrypted version Es of said key-seed s,
        (ii) providing said encrypted version Es of said key-seed s to said KMS, to obtain a decrypted version of said key-seed s associated with said user,
        (iii) generating, from said received decrypted version of said key-seed s, a secret HE key sk associated with said HE scheme, and
        (iv) using said secret HE key sk to decrypt said encrypted computation result, to obtain a decrypted version of said encrypted computation result.

2. The computer-implemented method of claim 1, further comprising, at an encryption stage:
    storing, in said untrusted storage location, encrypted data provided by said user,
    wherein said data is encrypted using a public HE key pk from said set of HE keys stored in said untrusted storage location, and
    wherein said encrypted computation result is generated by executing a program associated with said HE scheme over said encrypted data.

3. The computer-implemented method of claim 2, wherein said executing is performed using an evaluation HE key ek included in said set of HE keys.

4. The computer-implemented method of claim 1, further comprising deleting said encrypted version Es of said key-seed s, and said set of HE keys, upon said storing.

5. The computer-implemented method of claim 1, wherein said receiving comprises receiving, from said KMS, an encrypted version Ek of a data key dk, and using said encrypted data key Ek to encrypt said key-seed s, to obtain said encrypted version Es of said key-seed s.

6. The computer-implemented method of claim 5, wherein said storing comprises storing said encrypted data key Ek, said encrypted version Es of said key-seed s, and said set of HE keys, in an untrusted storage location.

7. The computer-implemented method of claim 6, wherein said decryption stage comprises decrypting said encrypted computation result, by:
    (i) recalling, from said untrusted storage location, said encrypted data key Ek and said encrypted version Es of said key-seed s;
    (ii) providing said encrypted data key Ek to said KMS, to obtain a decrypted version of said data key dk;
    (iii) using said decrypted version of said data key dk to decrypt said encrypted version Es of said key-seed s, to obtain said key-seed s;
    (iv) generating, from said key-seed s, a secret HE key sk associated with said HE scheme; and
    (v) using said generated secret HE key sk to decrypt said encrypted computation result.

8. The computer-implemented method of claim 1, wherein said untrusted storage location is cloud storage.

9. A system comprising:
    at least one hardware processor; and
    a non-transitory computer-readable storage medium having program code embodied therewith, the program code executable by said at least one hardware processor to:
        generate, from a key-seed s associated with a user, a set of homomorphic encryption (HE) keys associated with an HE scheme,
        receive, from a key management system (KMS) associated with said HE scheme, an encrypted version Es of said key-seed s,
        store said encrypted version Es of said key-seed s, and said set of HE keys, in an untrusted storage location, and
        at a decryption stage, decrypt an encrypted computation result generated using said HE scheme, by:
            (i) recalling, from said untrusted storage location, said encrypted version Es of said key-seed s,
            (ii) providing said encrypted version Es of said key-seed s to said KMS, to obtain a decrypted version of said key-seed s associated with said user,
            (iii) generating, from said received decrypted version of said key-seed s, a secret HE key sk associated with said HE scheme, and
            (iv) using said secret HE key sk to decrypt said encrypted computation result, to obtain a decrypted version of said encrypted computation result.

10. The system of claim 9, wherein said program instructions are further executable to, at an encryption stage:
    store, in said untrusted storage location, encrypted data provided by said user,
    wherein said data is encrypted using a public HE key pk from said set of HE keys stored in said untrusted storage location, and
    wherein said encrypted computation result is generated by executing a program associated with said HE scheme over said encrypted data.

11. The system of claim 10, wherein said executing of the program associated with said HE scheme is performed using an evaluation HE key ek included in said set of HE keys.

12. The system of claim 9, wherein said program instructions are further executable to delete said encrypted version Es of said key-seed s, and said set of HE keys, upon said storing.

13. The system of claim 9, wherein said receiving comprises receiving, from said KMS, an encrypted version Ek of a data key dk, and using said encrypted data key Ek to encrypt said key-seed s, to obtain said encrypted version Es of said key-seed s.

14. The system of claim 13, wherein said storing comprises storing said encrypted data key Ek, said encrypted version Es of said key-seed s, and said set of HE keys, in an untrusted storage location.

15. The system of claim 14, wherein said decryption stage comprises decrypting said encrypted computation result, by:
   (i) recalling, from said untrusted storage location, said encrypted data key Ek and said encrypted version Es of said key-seed s;
   (ii) providing said encrypted data key Ek to said KMS, to obtain a decrypted version of said data key dk;
   (iii) using said decrypted version of said data key dk to decrypt said encrypted version Es of said key-seed s, to obtain said key-seed s;
   (iv) generating, from said key-seed s, a secret HE key sk associated with said HE scheme; and
   (v) using said generated secret HE key sk to decrypt said encrypted computation result.

16. The system of claim 9, wherein said untrusted storage location is cloud storage.

17. A computer program product comprising a non-transitory computer-readable storage medium having program code embodied therewith, the program code executable by at least one hardware processor to:
   generate, from a key-seed s associated with a user, a set of homomorphic encryption (HE) keys associated with an HE scheme;
   receive, from a key management system (KMS) associated with said HE scheme, an encrypted version Es of said key-seed s;
   store said encrypted version Es of said key-seed s, and said set of HE keys, in an untrusted storage location; and
   at a decryption stage, decrypt an encrypted computation result generated using said HE scheme, by:
   (i) recalling, from said untrusted storage location, said encrypted version Es of said key-seed s,
   (ii) providing said encrypted version Es of said key-seed s to said KMS, to obtain a decrypted version of said key-seed s associated with said user,
   (iii) generating, from said received decrypted version of said key-seed s, a secret HE key sk associated with said HE scheme, and
   (iv) using said secret HE key sk to decrypt said encrypted computation result, to obtain a decrypted version of said encrypted computation result.

18. The computer program product of claim 17, wherein said program instructions are further executable to, at an encryption stage:
   store, in said untrusted storage location, encrypted data provided by said user,
   wherein said data is encrypted using a public HE key pk from said set of HE keys stored in said untrusted storage location, and
   wherein said encrypted computation result is generated by executing a program associated with said HE scheme over said encrypted data.

19. The computer program product of claim 18, wherein said executing of the program associated with said HE scheme is performed using an evaluation HE key ek included in said set of HE keys.

20. The computer program product of claim 19, further comprising deleting said encrypted version Es of said key-seed s, and said set of HE keys, upon said storing.

* * * * *